United States Patent [19]

Sommers

[11] Patent Number: 5,234,674
[45] Date of Patent: Aug. 10, 1993

[54] PROCESS FOR THE PREPARATION OF METAL CARBIDES

[75] Inventor: James A. Sommers, Albany, Oreg.

[73] Assignee: Teledyne Industries, Inc., Albany, Oreg.

[21] Appl. No.: 721,889

[22] Filed: Jun. 27, 1991

[51] Int. Cl.$^5$ .................... C01B 31/36; C01B 31/30
[52] U.S. Cl. .................... 423/345; 473/439; 473/440
[58] Field of Search .......... 423/68, 439, 440, 406, 423/644, 592, 324, 344, 345; 501/96, 87, 88

[56] References Cited

U.S. PATENT DOCUMENTS

| | | | |
|---|---|---|---|
| 2,164,198 | 6/1939 | Clements et al. | 148/12.1 |
| 2,474,021 | 6/1949 | Vining | 23/184 |
| 2,553,444 | 5/1951 | Dunn et al. | 423/68 |
| 2,682,445 | 6/1954 | Basel | 23/87 |
| 2,849,275 | 8/1958 | Bleecker | 423/440 |
| 2,886,616 | 5/1959 | Mertz et al. | 260/683.15 |
| 3,053,620 | 9/1962 | Greenberg et al. | 23/87 |
| 3,230,077 | 1/1966 | Hiller | 75/84.5 |
| 3,300,297 | 1/1967 | Fields | 423/68 |
| 3,322,510 | 5/1967 | Anselin et al. | 23/347 |
| 3,356,513 | 12/1967 | Washburn | 106/55 |
| 3,425,826 | 2/1969 | Schmidt et al. | 75/84 |
| 3,461,190 | 8/1969 | Kemeny et al. | 263/52 |
| 3,539,165 | 11/1970 | Ingels | 263/40 |
| 3,573,000 | 3/1971 | Toomey et al. | 23/277 |
| 3,639,101 | 2/1972 | Washburn | 23/203 R |
| 3,854,882 | 12/1974 | Washburn | 23/253 A |
| 3,999,981 | 12/1976 | Brandstatter | 423/440 |
| 4,029,740 | 6/1977 | Ervin, Jr. | 423/251 |
| 4,211,754 | 7/1980 | Van Hecke et al. | 423/62 |
| 4,318,897 | 3/1982 | Gonczy | 423/644 |
| 4,425,318 | 1/1984 | Maeland et al. | 423/644 |
| 4,440,737 | 11/1984 | Libowitz et al. | 423/644 |
| 4,607,826 | 8/1986 | Ron | 266/251 |
| 4,720,300 | 1/1988 | Nishizawa et al. | 75/85.4 |
| 4,727,928 | 3/1988 | De Vynck et al. | 164/469 |
| 4,728,507 | 3/1988 | Worcester | 423/645 |
| 4,741,894 | 5/1988 | Melas | 423/592 |
| 4,812,301 | 3/1989 | Davidson et al. | 423/440 |
| 4,913,778 | 4/1990 | Lee et al. | 203/29 |

FOREIGN PATENT DOCUMENTS

| | | |
|---|---|---|
| 470022 | 12/1950 | Canada . |
| 541516 | 5/1957 | Canada .................... 75/622 |
| 541517 | 5/1957 | Canada .................... 75/622 |
| 554840 | 3/1958 | Canada . |
| 903034 | 2/1954 | Fed. Rep. of Germany . |
| 1068683 | 11/1959 | Fed. Rep. of Germany . |
| 1082240 | 5/1960 | Fed. Rep. of Germany . |
| 339426 | 2/1991 | Japan . |
| 485021 | 6/1938 | United Kingdom . |
| 660397 | 11/1951 | United Kingdom . |
| 771144 | 3/1957 | United Kingdom . |
| 866771 | 5/1961 | United Kingdom . |
| 910289 | 11/1962 | United Kingdom . |
| 1211757 | 3/1973 | United Kingdom . |

OTHER PUBLICATIONS

Hattancadi, *Industrial Chemist*, vol. 9, No. 5, May 1988, pp. 20-23.
Mellor, "A Comprehensive Treatise on Inroganic Chemistry", vol. VIII, Longmans, Green & Co., 1947, pp. 124-126.
Hattangadi, "How to Set a Periodic Table", Industrial Chemist, vol. 9, No. 5, 1988, pp. 20-23.
Hart, The Reduction of Columbic Acid and the Measurement of the Oxidation Potential of the Pentavalent-Trivalent Columbium System, 226-227, 1926.

(List continued on next page.)

Primary Examiner—Michael Lewis
Assistant Examiner—Stephen G. Kalinchak
Attorney, Agent, or Firm—Shoemaker and Mattare, Ltd.

[57] ABSTRACT

A process for the recovery of metal carbides from ferroalloys and nickel alloys of niobium, tantalum, vanadium, and hydrides thereof is disclosed. The selected ferroalloy or nickel alloy is contacted with a hydrogen containing gas, subdivided, and carbided by contact with a hydrocarbon containing gas at a temperature above 500° C. The carbided reaction product is then leached with an aqueous acid solution for recovery.

12 Claims, 1 Drawing Sheet

OTHER PUBLICATIONS

Sherwood, Columbium, Rare Metals Handbook, pp. 149-177.
McClain et al., Zirconium-Hafnium Separation, Chapter 4, pp. 64-73, 1960.
Kroll et al., Pilot Plants, Production of Malleable Zirconium, vol. 42, No. 2, pp. 395-396, 1950.
Fairgrieve et al., Hafnium, Molybdenum Techniques Revealed, Journal of Metals, pp. 25-26, 1960.
Spink, Fused-Salt Scrubbing of Zirconium Tetrachloride, Transactions Aime, vol. 224, pp. 965-970, 1962.
Fairbrother, The Chemistry of Niobium and Tantalum, pp. 4, 5, 8-19, 1967.
de Hoboken, Production of Tantalum and/or Columbium, pp. 1-6.
Pennington, Derivatives of Columbium and Tantalum, 1985.
Duke, Resources and Planning Advisory Council, vol. VIII, pp. 1-51, 1969.
Stuart, Niobium, Proceedings of the International Symposium, pp. 3-16; 1237-1249, 1981.
Gibalo, Analytical Chemistry of Niobium and Tantalum, pp. 118-140, 1970.
Merrill, The Separation of Columbium and Tantalum by Means of Selenium Oxychloride, pp. 2378-2383, 1921.

PROCESS FOR THE PREPARATION OF METAL CARBIDES

FIELD OF THE INVENTION

The present invention relates to the formation of metal carbides, and more particularly metal carbides prepared from ferroalloys of Group IV, Group V, and Group VI metals, and most particularly, with the preparation of metal carbides from ferroniobium, ferrotantalum, ferrovanadium and ferrosilicon.

BACKGROUND OF THE INVENTION

Niobium carbide (NbC) and other metal carbides of Group IV, Group V, and Group VI metals are generally ceramic like materials exhibiting extreme hardness. Some of these metals including niobium carbide are useful as or for abrasives, dies, steel additives, ceramic bodies and the like. Niobium carbide is also useful for tool bits.

In the past, NbC which is exemplary of the metal carbides formed according to this invention, has been made by such methods as reactions of niobium oxides or niobium metal with carburizing agents such as elemental carbon or hydrocarbon-containing gases. For the reaction to proceed from these starting materials, extreme reaction temperatures are normally required. Typically, temperatures ranging from 1200°–1700° C. are necessary. These niobium-containing starting materials are expensive to produce and therefore the final carbide product is rendered very expensive. Further, the conventional preparation of niobium oxide and niobium metal has involved the direct chlorination of the niobium containing starting material at high temperatures in special reaction vessels that are graphite lined to reduce the corrosive effect of chlorine gas. If ferroniobium is employed as the starting material, chlorine gas is passed through a bed of ferroniobium at a temperature of from about 500° C. to about 1000° C.

The reaction can be characterized as follows:

$$FeNb + 4Cl_2 \rightarrow FeCl_3 + NbCl_5 + heat$$

This reaction is exothermic and once started provides considerable heat and must, therefore, be carefully controlled. The FeCl$_3$ and NbCl$_5$ produced must be separated and this is accomplished by passing the chlorides in the vapor state through a heated bed of sodium chloride (NaCl) where the FeCl$_3$ forms a eutectic composition with the NaCl and is thereby removed from the vapor process stream. The NbCl$_5$ can then be subsequently condensed by cooling.

This chlorination step utilizes toxic chlorine gas reacted exothermically at elevated temperatures and pressures. The conditions produce potentially severe corrosion and safety problems. Special equipment is necessary for handling the highly pressurized, corrosive liquid chlorine and it must be safely vaporized, metered and fed into the reactor. Likewise, the most suitable material for reactor construction is graphite. This is a brittle material which can fracture and fail abruptly after a short time in use in this environment. Further, the chlorine is normally used in excess to ensure complete reaction with the FeNb and the excess must be neutralized creating an expensive, undesirable by-product.

The condensed NbCl$_5$ can, if desired, be distilled to achieve higher purity material. Distilled or undistilled, NbCl$_5$ is then hydrolyzed by its addition to water and then the bath is neutralized, and the insoluble product can be dried before being calcined in a heated kiln in the presence of oxygen to produce Nb$_2$O$_5$. The hydrolysis and neutralization steps can produce undesirable byproducts and the drying and calcining steps are both energy intensive and expensive.

The Nb$_2$O$_5$ obtained as described can then be metallothermically reduced with aluminum powder in a batch reaction to form Nb metal according to the following equation:

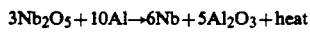

$$3Nb_2O_5 + 10Al \rightarrow 6Nb + 5Al_2O_3 + heat$$

This reaction is very exothermic attaining temperatures in excess of the melting point of the products which are then separated by gravity while in the molten state. While expensive, metallothermic reduction is effective with good yields.

The other methods for Nb extraction from FeNb involve caustic or carbonate fusions, which when leached or washed, give niobium oxide which is fairly pure and may be purified further by chlorination or other means presently known to the art. Ultimately, the oxide must be metallothermically reduced as previously described, or carbothermically reduced to Nb metal.

The process of reducing Nb$_2$O$_5$ carbothermically is difficult to do on a production basis since doing so requires large thermal input, vacuum vessels, and a careful balance of carbon to oxygen so that the resulting metal is not contaminated with either carbon or oxygen. If the carbon to oxygen ratio is maintained at nearly stoichiometric amounts, then the reaction proceeds rapidly until only a few percent of either remains unreacted. The reaction then proceeds slowly and it is difficult for it to reach completion. For this reason, carbothermic reduction is not currently used commercially.

Another method for extracting Nb from FeNb could theoretically be the direct electron beam melting and purification of FeNb by preferential vaporization of the Fe. This becomes very expensive in practice as the melting point of FeNb is low and a great amount of electrical power is needed to superheat and vaporize the 20 to 40 weight percent of iron present. Though possible, it is not economically feasible.

Synthesis techniques for niobium carbide, other than reaction with niobium metal, are described in "Refractory Hard Metals" by Schwarzkopf and Kieffer (MacMillan, New York, 1953). Among those cited therein are the reaction of Nb$_2$O$_3$ and mixtures containing niobium oxide including mixtures containing niobium metal, with carbon (as carbon black). This process also requires oxides of niobium which are costly.

Still another reaction scheme described involves reaction of a mixture of niobium chloride, hydrogen and hydrocarbon gases. However, niobium chloride is only available from chlorination of niobium metal or ferroniobium.

It is, therefore, desirable to have a reaction mechanism for obtaining the carbides of the Group IV, V and VI metals utilizing commercially available ferrometal alloys as the starting material, which avoids the complicated costly reactions involving preparation of the metal oxides or metal.

OBJECTS OF THE INVENTION

It is, therefore, an object of the present invention to provide an economical process for the preparation of metal carbides of the Group IV, V and VI metals including niobium carbide that does not use direct chlorination and only modest temperatures compared thereto.

It is a further object of the present invention to provide such a process that can employ as the starting material a ferrometal alloy of the desired metal carbide.

It is a still further object of the present invention to provide a method for producing oxides of the Group IV, V and VI metals from their respective carbides formed by the reaction of a hydrocarbon gas with hydrided ferro and nickel metal alloys.

It is a still further object of the present invention to provide a method of making niobium carbide from its ferrometal alloy which process substantially reduces the presence in the resultant product of impurities such as silicon and phosphorus.

SUMMARY OF THE INVENTION

Niobium carbide (NbC) and other carbides of Group IV, Group V, and Group VI metals are prepared according to the present invention by the following process steps starting with the ferrometal alloy of the desired metal carbide. The ferrometal alloy of niobium is described herein as exemplary of the metals described.

Starting with commercial or metallurgical grade ferroniobium, the process includes:

1) Hydriding the ferroalloy;
2) Comminuting the hydrided ferroalloy to a preselected range of particle sizes;
3) Reaction of the hydrided ferroalloy with a hydrocarbon containing gas at elevated temperatures to form metal carbides;
4) Leaching the iron and iron containing compounds formed in Step 3) away from the metal carbides by the use of an aqueous acid leach liquor;
5) Recovering the desired metal carbide from the residue of the leaching step.

DETAILED DESCRIPTION OF THE PREFERRED EMBODIMENT

Figure 1:
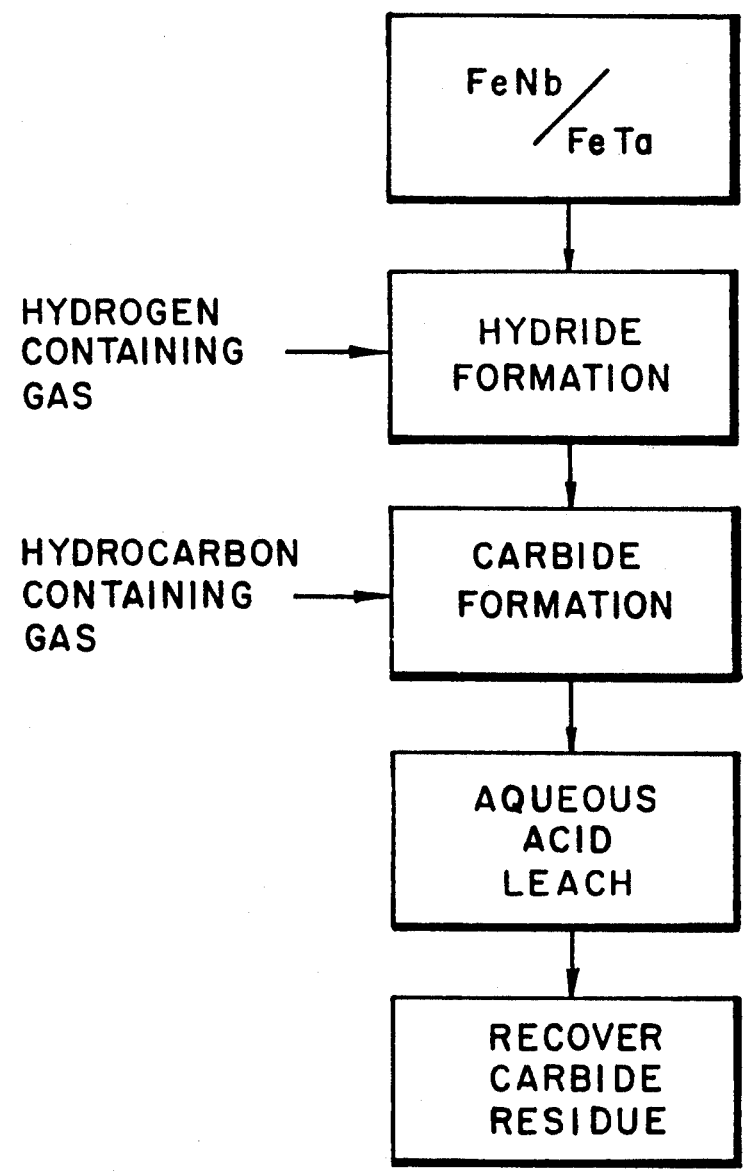
FIG. 1 is a schematic block diagram of the process of the present invention.

The foregoing process steps are described in further detail hereinafter.

HYDRIDING OF FERRONIOBIUM

Commercial grade ferroniobium is used as the starting material. Typically, the ferroniobium will contain from between about 20% and 40% weight percent iron and minor amounts, i.e., less than about 10% total weight percent of silicon, aluminum, tantalum, phosphorus and titanium.

The ferroniobium is contacted with hydrogen gas at a positive pressure typically up to about 15 psig. There is no need to exceed this pressure for the reaction to proceed to completion. A vessel containing the ferroniobium is first evacuated, then backfilled and overpressured with hydrogen and held there to allow time for uptake. The hydrogen pressure need not be excessive, nor is there need for elevated temperature. The hydrogen level of the product is raised to about 200 to 2000 weight ppm, usually approximately 1200 ppm.

GRINDING OF THE HYDRIDE PRODUCT

The product of the previous step is ground or milled to a particle size of less than 20 mesh, preferably less than 140 mesh.

The hydriding step made this unexpectedly easy to do. It is contemplated that any pretreatment of the starting material that renders it relatively easily comminutable could be used in the process of the present invention. The criteria for commercial success of the overall process is largely governed by the ability of the comminuted material to react relatively easily in the following process step.

REACTION WITH A HYDROCARBON-CONTAINING GAS

The comminuted hydrided ferroalloy containing from between about 200 to about 2000 parts per million by weight of hydrogen is contacted in a suitable reaction vessel with gas containing hydrocarbons which are gaseous at the reaction temperature which can be from about 700° C. to about 1100° C. A rapid reaction rate can be achieved at temperatures of about 900° C. The following example typifies the results which can be obtained.

EXAMPLE 1

Ferroniobium hydride of a size less than 140 mesh (16.70 g), was placed in a ceramic boat inside a quartz tube in a muffle furnace. Methane gas was flowed (200 ml/min) over it as its temperature was raised to 970° C. over two hours and held at 970°-975° C. for 3¼ hours. It was cooled to room temperature. A weight gain of 4.56 g was observed. The hydrided ferroniobium charged was not ferromagnetic. The product of the reaction described to form the carbides of iron and niobium was ferromagnetic. At the temperatures employed, significant diffusion of the iron and iron compounds away from the niobium carbide was observed.

LEACHING OF THE CARBIDE PRODUCT

The previous step having made the iron content of the ferroniobium compound available for leaching, it can be substantially removed, along with silicon and phosphorous by using dilute HCl containing fluoride ions. The fluoride source may be a soluble, fluoride ion producing compound, such as hydrofluoric acid, ammonium bifluoride or sodium fluoride. The leach is aided by being conducted at somewhat elevated temperatures such as about 50° C.

The material of the previous Example was lightly ground to less than 60 mesh and leached for three hours at temperatures ranging from 45° C. to 85° C. The leach acid was made of 100 ml 12N HCl+110 ml $H_2O$+3.5 ml 48% HF. The solids after leaching were dried and then characterized by X-ray diffraction and analysis for Fe, Si and P impurities. The sample lost 25% of its weight in the leach step.

The X-ray diffraction pattern was that of niobium carbide plus one small peak (<1% of the strongest peak for NbC) at 3.36 Å which is the location of the strongest peak for graphite. The cubic lattice parameter $a_o$ was found to have the value of 4.467 Å, compared to 4.4698 Å from the JCPDS file card no. 38-1364.

Both the starting ferroniobium hydride and the leached carbide were analyzed as follows:

TABLE 1

| | Ferroniobium Hydride | Leached Carbide |
|---|---|---|
| Fe, % | 30.2 | 0.80 |
| Si, % | 1.13 | <0.05 |
| P, ppm | 730 | 310 |

The foregoing description of the process of the present invention has specifically shown how a ferroniobium alloy can be used as the starting material in a process for economically producing niobium carbide.

Variations in the process conditions can be employed within the spirit and scope of this invention as defined by the appended claims interpreted in view of the pertinent prior art to make the inventive process equally applicable to the preparation of other metal carbides from their ferrometal alloys or nickel metal alloys including preferably ferrovanadium, ferrotantalum and ferrosilicon.

I claim:

1. A process for the recovery of metal carbides from ferroalloys and nickel alloys of niobium, tantalum, vanadium and silicon and hydrides and mixtures thereof comprising the steps of:
   a) contacting the selected ferroalloy or nickel alloy with a hydrogen-containing gas under conditions suitable for the production of a friable, communitable reaction product;
   b) subdividing the hydrided product into particles having a mesh range size of less than about 140 mesh
   c) carbiding the hydride product by contacting the subdivided hydride product with a hydrocarbon-containing gas at a temperature above about 500° C., for a sufficient period of time to substantially completely react the hydrocarbon-containing gas with the hydride product to form carbides of the alloy constituents;
   d) leaching the carbided reaction product with an aqueous acid solution;
   e) recovering the residue carbide.

2. The process of claim 1, wherein the contacting step a) is carried out in the substantial absence of a reactive gas other than hydrogen.

3. The process of claim 2, wherein the contacting step a) is carried out in the substantial absence of oxygen.

4. The process of claim 1, wherein the aqueous acid solution is 1N to 12N hydrochloric acid.

5. The process of claim 1, wherein the aqueous acid solution contains fluoride ions.

6. The process of claim 4, wherein the aqueous acid solution contains fluoride ions.

7. The process of claim 1, wherein the step of carbiding is conducted in a hydrocarbon-containing atmosphere at a sufficiently high temperature and for a sufficiently long period of time to convert the ferroalloy product of step a) into two distinctly observable phases containing respectively iron carbide and metal carbide.

8. The process of claim 1, wherein the ferroalloy is selected from the group consisting of ferroniobium, ferrotantalum, ferrovanadium and ferrosilicon.

9. The process of claim 7, wherein the ferroalloy is ferroniobium containing between about 63% to about 67% by weight of niobium.

10. A process for the production of niobium carbide from ferroniobium containing silicon and phosphorous comprising the steps of:
   a) contacting ferroniobium initially with hydrogen gas at room temperature for a sufficient period of time for the ferroniobium to react with hydrogen sufficiently to produce a friable, comminutable product;
   b) preparing particle sizes of the product of step a) in the range of less than about 20 mesh;
   c) contacting the particles of step b) with a hydrocarbon-containing gas at a temperature in excess of about 700° C. and below the decomposition temperature of iron carbide and niobium carbide for a sufficient period of time to substantially completely react the product of steps a) and b) with the hydrocarbon gas and produce a carbided product containing at least some separate and distinct phases of iron carbide and niobium carbide;
   d) contacting the product of step c) with an aqueous acid leach solution of sufficient concentration and for a sufficiently long period of time to remove the acid soluble iron carbide from the niobium carbide;
   e) recovering the niobium carbide.

11. The process of claim 10, wherein the aqueous acid leach solution of step d) contains sufficient fluoride ions to dissolve and remove the silicon and phosphorous from the carbide product of step c).

12. The process of claim 10, wherein the aqueous acid leach solution of step d) is about 1N to about 12N hydrochloric acid.

* * * * *